May 5, 1970     T. B. SELOVER, JR., ET AL     3,510,359

FUSED SALT ELECTROCHEMICAL BATTERY WITH INORGANIC SEPARATOR

Filed March 22, 1967

INVENTOR.
JAMES L. BENAK
BY THEODORE B. SELOVER, JR.

ATTORNEYS

United States Patent Office 3,510,359
Patented May 5, 1970

3,510,359
FUSED SALT ELECTROCHEMICAL BATTERY WITH INORGANIC SEPARATOR
Theodore B. Selover, Jr., Shaker Heights, and James L. Benak, Bedford Heights, Ohio, assignors to The Standard Oil Company, Cleveland, Ohio, a corporation of Ohio
Filed Mar. 22, 1967, Ser. No. 625,053
Int. Cl. H01m 3/00
U.S. Cl. 136—146                               7 Claims

ABSTRACT OF THE DISCLOSURE

A separator for an electrical energy storage device comprising a material selected from the group consisting of beryllium oxide (BeO), thorium oxide (ThO$_2$), magnesium oxide (MgO), lithium aluminate (LiAlO$_2$), boron nitride (BN), silicon nitride (Si$_3$N$_4$), aluminum nitride (AlN) and mixtures thereof.

BACKGROUND OF THE INVENTION

This invention relates to a separator of ion permeable insulating material for an electrical energy storage device. The electrochemical storage device comprises electrodes and an ion-containing and conducting medium. Separators of the type to which the present invention pertains must be useful under the most chemically severe operating conditions of the electrochemical device and must constitute between electrodes of opposite polarity an effective barrier means, serving to space the electrodes. Under operating conditions, the electrodes undergo distortion as is evidenced by buckling and swelling of the electrodes. Heretofore the distortion was compensated for by spacing the electrodes far enough apart so that even after buckling and swelling the electrodes failed to contact one another. Thus by one method of the prior art short-circuiting between electrodes was avoided. However, such excessive spacing was both wasteful and inefficient.

Separator materials of the prior art have included such materials as wood fiber, regenerated cellulose, polyacrylonitrile and other resinous materials. Such materials have been used in conventional lead-acid batteries, but are not suitable in a highly corrosive atmosphere as envisioned by the energy storage device herein described.

The general requirements of the separator of the present invention are that it be easy to fabricate, compact and inexpensive. The separator, which is desirably paper thin to allow as compact a storage device as possible must possess the mechanical strength to withstand operating conditions entailing charging and discharging of the cell. Because electrochemical reaction devices, as herein described, operate over a wide temperature range, from about ambient to 750° C. and above, depending on the electrolyte, the internal components are subject to considerable stresses in the form of expansion and contraction. Therefore, the separator of the present invention must possess the structural integrity to withstand diverse ranges of operating conditions. The separator must also possess insulating properties to prevent the short-circuiting of the electrodes should a bridge form from materials capable of promoting the formation of short-circuits.

Also, depending on the type, the separator must have a maximum porosity. The separator must accommodate ionic diffusion. Any hindrance of the ions in their movement affects the efficiency of the electrochemical device. Of course, the porosity of the separator desirably approaches 100 percent.

Also, because the separator of the present invention is designed for use in a highly corrosive, high-temperature atmosphere, it is manifest that it have a high melting point, and be chemically and thermally inert and stable and insoluble under operating conditions.

Finally, the separator must be harmless to handle and relatively pure. Contaminants are attacked by the ion-containing and conducting medium. The separator should contain less than 5 weight percent contaminants and, practically speaking, should contain much less.

It is particularly difficult to find a separator material for use in an energy storage device as herein described comprising an environment of a fused salt ion-containing and conducting medium and its decomposition products at operating potentials and at temperatures ranging upward to about 750° C.

DESCRIPTION OF THE INVENTION

It has now been discovered that the aforementioned requirements for a separator are met by constructing the separator of a material selected from the group consisting of beryllium oxide (BeO), thorium oxide (ThO$_2$), magnesium oxide (MgO), lithium aluminate (LiAlO$_2$), boron nitride (BN), silicon nitride (Si$_3$N$_4$), aluminum nitride (AlN) and mixtures thereof.

Referring more particularly to the drawings.

Other forms of the separator are also envisioned, such as for example foam, fiber and paper. The first step in making one type of electrode separator form is to circumscribe the electrodes with a fibrous material, then dip the wrapped electrodes in an ion-containing and conducting medium, and remove any mobile ion-containing and conducting medium. The ion-containing and conducting medium which remains to complete the electrochemical system is that medium which is held interstitially by the fibers, i.e., medium which adheres to the fibers, and possibly the electrodes. By such a construction, any possible self-discharge is lessened and inner electrode distance and liquid volume are minimized.

Figure 1:
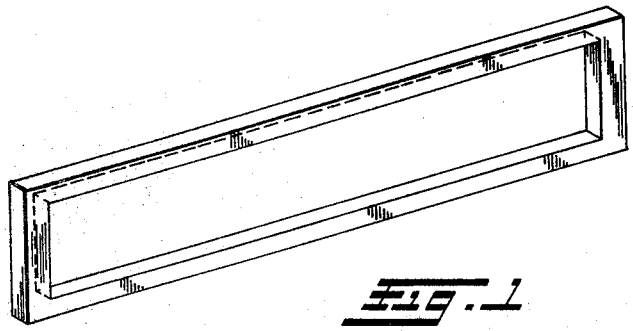
FIG. 1 illustrates another embodiment of the present invention, a window design separator to be inserted between oppositely charged electrodes.
Figure 2:
FIG. 2 illustrates a peg or bead separator construction with the separator normal to the electrode.
Figure 3:
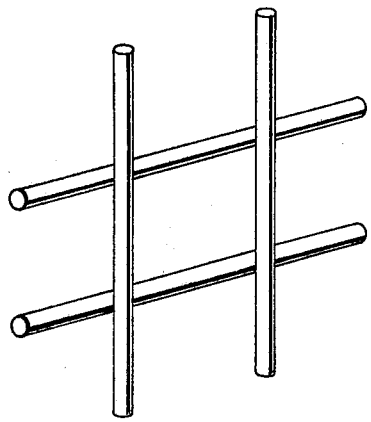
FIG. 3 illustrates a crossed bar design separator.
Figure 4:
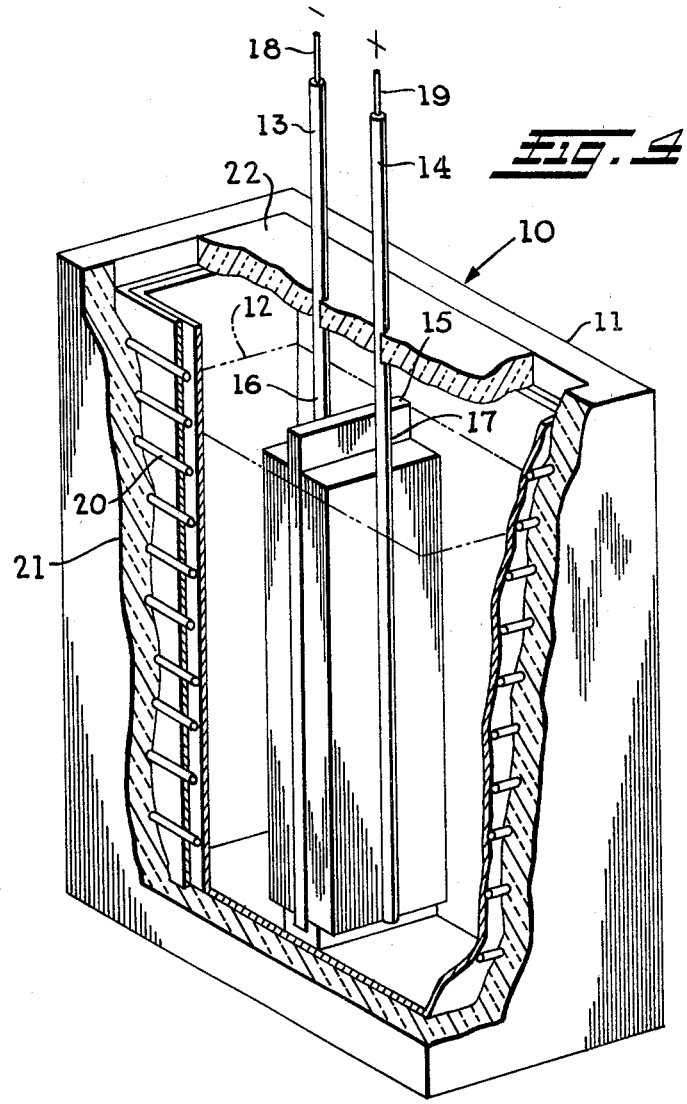
FIG. 4 illustrates a perspective view, partially broken away, of a fiber, plate or felt separator used in an electrical energy storage device.

Referring more particularly to FIG. 4, there is shown generally at reference numeral 10 an electrical energy storage device of the present invention. A casing or housing 11 serves as a storage reservoir for ion-containing and conducting medium 12. Contained within the housing and immersed in the ion-containing and conducting medium are oppositely charged electrodes 13 and 14, oppositely placed from one another with separator 15 and the ion-containing and conducting medium intermediate thereof. Securely attached to the electrodes are current carriers 16 and 17 leading to electrical leads 18 and 19 which connect to a load (not shown). The housing is fabricated of heat resistant, non-corroding material. The material must be an inert material such as cast iron or sheet steel. Within the walls of the housing are heating elements 20 to supply heat to the electrochemical device until operating temperatures are reached. Once operating temperatures are attained and the device is functioning, the temperatures are independently maintained. The device is also insulated by an insulating material 21 such as, for example, asbestos and fiber glass. The electrical energy storage device is sealed by a ceramic oxide, nitride or fluoride salt 22.

The negative electrode of the energy storage device contains as one chemical element a cation common to the component of the ion-containing and conducting medium with the lowest decomposition potential, such as lithium, potassium, sodium and magnesium. The positive electrode is formed from a material capable of storing the anion of the ion-containing and conducting component with the lowest decomposition potential such as for example carbon and nickel. In the embodiment shown, each electrode is insulated from the casing or housing, but it is recognized that in another embodiment one of the electrodes may be directly attached to the housing and the opposed electrode attached to a header or plate insulated from the housing. Thus for one electrode, the housing serves as a current collector while for the other the header serves as a current collector.

The ion-containing and conducting medium is a medium comprising a source of ions and preferably alkali metal or alkaline earth (Groups I–A and II–A) cations and nitrate, nitrite, halide or certain carbonate anions free to move in the medium. Typical examples of materials which can be used as ion-containing and conducting media include binary and ternary salt mixtures such as lithium chloride-potassium chloride, potassium iodide-lithium iodide, potassium chloride-magnesium chloride, magnesium chloride-sodium chloride, lithium bromide-potassium bromide, calcium chloride-lithium chloride, lithium fluoride-rubidium fluoride, magnesium chloride-rubidium chloride and mixtures thereof. Examples of ternary mixtures are lithium chloride-potassium chloride-sodium chloride and lithium bromide-sodium bromide-lithium chloride. A preferred ion-containing and conducting medium is a eutectic of potassium chloride and lithium chloride.

As alluded to earlier, one of the advantages of the present invention is not only to prevent short-circuiting but also to minimize inner electrode distance which results in greater cell utilization. This is reflected quantitatively as packing efficiency. By decreasing the electrode distance a small amount, considerable benefit is seen in the packing efficiency.

The terms cell and storage device have been used herein interchangeably, although it is recognized a storage device is generally considered an assemblage of one or more cells.

The following examples are illustrative of the present invention.

EXAMPLE I

The separator of the present invention was tested in an electrochemical reaction cell comprising a lithium chloride-potassium chloride eutectic at 500° C. with a Li–Al anode and a carbon cathode. The housing of the cell was a 304 SS test tube 9 inches long and 1½ inches inside diameter with the fused salt about 5 inches from the top of the test tube. Then the test tube was sealed by a lava block with holes and current carriers. Purified argon gas was used to continually purge the cell. The lithium containing electrode was 1¼ inches x ½ inch x 1/10 inch. The carbon electrode was 1 inch x ½ inch x 1/8 inch. The lithium electrode was welded to a 304 SS rod used as a current carrier. A graphite rod was used as the current carrier for the carbon electrode by cementing it together.

The separator was boron nitride felt, between electrodes providing a clearance of 0.016 inch. The cell was cycled for 4 days between 3.34 v. and 1.00 v. In this manner one side of the separator was constantly exposed to a potential of −3.34 v. relative to chlorine evolution and the opposite face of the separator was exposed to potentials of from 0 to −2.34 v. relative to chlorine evolution. The cell was charged at a constant voltage of 3.34 and discharged at a constant current of 200 milliamps down to 1.0 v., then recharged. The separator was inspected after completion of the test and found to be in excellent condition.

EXAMPLE II

The procedure of Example I was repeated except that the separator was boron nitride fiber wrapped between and around the electrodes to give a 1/16 inch inner electrode distance between the electrodes. The cell was cycled for 11 days between 3.34 v. and 1.0 v. During cycling, the electrodes had buckled, yet the separator had prevented the electrodes contacting one another. The separator was inspected after completion of the test and found to be in excellent condition.

EXAMPLE III

The procedure of Example I was repeated with the following exceptions: (1) the separator was boron nitride fiber wrapped between and around both electrodes to provide interelectrode gap of 0.35 inch; (2) the wrapped electrodes were dipped into the lithium chloride-potassium chloride electrolyte and then removed, so that electrolyte present in the system was held interstitially by said fibers; and (3) the cell was discharged down to 0.90 v.

The separator was inspected after completion of the test and found to be in excellent condition.

Whereas it takes 2 days for a battery without a spacer to self-discharge at open circuit from 3.2 to 2.0 v. it took 7 days for this cell to self-discharge from 3.2 to 2.0 v. It appears that the fiber separator immobilizes sludge which otherwise would cause shorting and rapid self-discharge.

EXAMPLE IV

The procedure of Example I was repeated using a porous BN plate of 3/32 inch thickness. The cell was cycled for 24 days between 3.34 v. and 1.00 v. The separator showed no sign of degrading after completion of the test.

EXAMPLE V

The procedure of Example I was repeated except that a porous beryllium oxide (BeO) 3/32 inch thick plate was used as a separator. The separator at the completion of the test showed no sign of degrading.

EXAMPLE VI

The procedure of Example I was repeated except that a porous thorium oxide ($ThO_2$) 3/32 inch thick plate was used as a separator. The separator at the completion of the test showed no sign of degrading.

EXAMPLE VII

The procedure of Example I was repeated except that a porous magnesium oxide (MgO) 3/32 inch thick plate was used as a separator. The separator at the completion of the test showed no sign of degrading.

EXAMPLE VIII

The procedure of Example I was repeated except that a porous lithium aluminate ($LiAlO_2$) 3/32 inch thick plate was used as a separator. The separator at the completion of the test showed no sign of degrading.

EXAMPLE IX

The procedure of Example I was repeated except that a porous silicon nitride ($Si_3N_4$) 3/32 inch thick plate was used as a separator. The separator at the completion of the test showed no sign of degrading.

EXAMPLE X

The procedure of Example I was repeated except that a porous aluminum nitride (AlN) 3/32 inch thick plate was used as a separator. The separator at the completion of the test showed no sign of degrading.

What is claimed is:
1. An electrochemical battery comprising,
   (a) an ion-containing and conducting medium of a fused salt,

(b) a pair of opposed, oppositely charged electrodes disposed therein, and intermediate thereof,
(c) a porous separator consisting essentially of boron nitride, silicon nitride, aluminum nitride, or mixtures thereof,
(d) said electrodes and ion-containing and conducting medium coacting to cause an electrical potential to be produced between the electrodes externally of the device.

2. The electrochemical battery of claim 1 wherein the separator is a fibrous material.

3. The electrochemical battery of claim 2 wherein the fibrous separator material is wrapped around the electrodes of the electrical energy storage device.

4. An electrochemical battery comprising,
(a) an ion-containing and conducting medium of a fused salt,
(b) a pair of opposed, oppositely charged electrodes disposed therein, and intermediate thereof,
(c) a porous separator consisting essentially of boron nitride.
(d) said electrodes and ion-containing and conducting medium coacting to cause an electrical potential to be produced between the electrodes externally of the device.

5. The electrochemical battery of claim 4 wherein the separator consists essentially of fibrous boron nitride.

6. The electrochemical battery of claim 5 wherein the fibrous boron nitride separator is wrapped around the electrodes.

7. The electrochemical battery of claim 4 wherein the separator is a boron nitride felt material.

References Cited

UNITED STATES PATENTS

| | | | |
|---|---|---|---|
| 2,276,188 | 3/1942 | Greger | 136—86 |
| 2,597,118 | 5/1952 | Brooks et al. | 136—144 |
| 3,351,491 | 11/1967 | Harris et al. | 136—86 |
| 3,404,041 | 10/1968 | Inami | 136—153 XR |
| 3,410,731 | 11/1968 | Rightmire et al. | 136—83 XR |
| 3,419,436 | 12/1968 | Recht et al. | 136—153 XR |
| 1,506,391 | 8/1924 | Sturges | 136—147 |
| 3,238,437 | 3/1966 | Foster et al. | 136—83 XR |
| 3,258,365 | 6/1966 | Klopp et al. | 136—137 XR |
| 3,367,800 | 2/1968 | Panzer | 136—83 |

WINSTON A. DOUGLAS, Primary Examiner

D. L. WALTON, Assistant Examiner

U.S. Cl. X.R.

136—153